United States Patent
Osaki

(10) Patent No.: US 11,797,209 B2
(45) Date of Patent: Oct. 24, 2023

(54) STORAGE POOL DETERMINATION SYSTEM

(71) Applicant: Hitachi, Ltd., Tokyo (JP)

(72) Inventor: Hiroyuki Osaki, Los Gatos, CA (US)

(73) Assignee: HITACHI, LTD., Tokyo (JP)

(*) Notice: Subject to any disclaimer, the term of this patent is extended or adjusted under 35 U.S.C. 154(b) by 7 days.

(21) Appl. No.: 17/217,757

(22) Filed: Mar. 30, 2021

(65) Prior Publication Data
US 2022/0317907 A1 Oct. 6, 2022

(51) Int. Cl.
*G06F 3/06* (2006.01)

(52) U.S. Cl.
CPC ............ *G06F 3/0644* (2013.01); *G06F 3/067* (2013.01); *G06F 3/0608* (2013.01); *G06F 3/0626* (2013.01); *G06F 3/0631* (2013.01)

(58) Field of Classification Search
CPC .... G06F 3/0605; G06F 3/0608; G06F 3/0626; G06F 3/0631; G06F 3/0644; G06F 3/067; G06F 3/0683
USPC ................................. 711/117, 148, 154, 170
See application file for complete search history.

(56) References Cited

U.S. PATENT DOCUMENTS

| | | | | |
|---|---|---|---|---|
| 8,639,908 B2* | 1/2014 | Lewis | ............... | G06F 3/067 |
| | | | | 711/E12.019 |
| 8,930,621 B2* | 1/2015 | Hiwatashi | ............ | G06F 3/0607 |
| | | | | 711/170 |
| 10,834,189 B1* | 11/2020 | Chopra | ............... | H04L 67/1012 |
| 2009/0276588 A1* | 11/2009 | Murase | ................. | G06F 3/0647 |
| | | | | 711/E12.071 |
| 2011/0296052 A1* | 12/2011 | Guo | ........................ | H04L 45/34 |
| | | | | 718/1 |
| 2012/0311260 A1* | 12/2012 | Yamagiwa | ............ | G06F 3/0604 |
| | | | | 711/E12.016 |
| 2013/0111129 A1* | 5/2013 | Maki | ..................... | G06F 3/0689 |
| | | | | 711/E12.016 |
| 2018/0081586 A1* | 3/2018 | Kazi | ..................... | G06F 3/0611 |
| 2019/0114102 A1* | 4/2019 | Chen | ..................... | G06F 3/0631 |

OTHER PUBLICATIONS

NetApp ONTAP 9 Documentation Center "https://docs.netapp.com/ontap-9/index.jsp?topic=%2Fcom.netapp.doc.dot-ivg%2FGUIDA02D4A6C-" retrieved on Jan. 8, 2021 (52 pages).

* cited by examiner

*Primary Examiner* — Rocio Del Mar Perez-Velez
*Assistant Examiner* — Marwan Ayash
(74) *Attorney, Agent, or Firm* — Procopio, Cory, Hargreaves & Savitch LLP

(57) ABSTRACT

Example implementations described herein are directed to a method and a system for storage allocation from a storage pool, the method involving, for receipt of a request for storage through an orchestrator communicatively coupled to a management system managing the storage pool, the request comprising user information and request characteristics information, the request characteristics information indicative of a use type for the request, determining a storage tier from the storage pool for the request based on the user information and the request characteristics information; and allocating a pool name and the storage tier in response to the request.

19 Claims, 13 Drawing Sheets

STORAGE POOL DETERMINATION SYSTEM

BACKGROUND

Field

The present disclosure is generally directed to storage pools, and more specifically, to storage pool determination systems.

Related Art

An information technology (IT) system often has many storage pools. IT system users deploy many applications on the IT system and each application requests volumes. Volumes are created and allocated in any one of the storage pools.

Each volume should be allocated in an appropriate pool, as some applications for specific organizations may need high-performance data processes. Each application can have a different purpose (e.g., machine learning training, financial trading, etc.). In such IT systems, many organizations are competing for the shared high-performance storage pools.

IT system administrators should determine an appropriate pool from many storage pools for each of the volume requests. The system administrators may have to pay monthly or daily cost of storage usage depending on the total storage capacity and storage pool type (e.g., some pools are high performance but costly, while other pools are low performance but cheaper). The administrators have a need to reduce the total cost for the IT system as long as they meet requirements for every application. Thus, the IT system admin often uses an orchestrator tool such as Kubernetes as well as its automatic pool allocation mechanism.

In an example related art implementation, the allocation mechanism read user volume requests which includes the pool name for specifying the desired storage pool. In another example related art implementation, the allocation mechanism has label information for each pool and, reads user volume requests through label matching.

SUMMARY

Aspects of the present disclosure can involve a method for storage allocation from a storage pool, the method involving, for receipt of a request for storage through an orchestrator communicatively coupled to a management system managing the storage pool, the request having user information and request characteristics information, the request characteristics information indicative of a use type for the request, determining a storage tier from the storage pool for the request based on the user information and the request characteristics information; and allocating a pool name and the storage tier in response to the request.

Aspects of the present disclosure can involve a non-transitory computer readable medium, storing instructions for storage allocation from a storage pool, the instructions involving, for receipt of a request for storage through an orchestrator communicatively coupled to a management system managing the storage pool, the request having user information and request characteristics information, the request characteristics information indicative of a use type for the request, determining a storage tier from the storage pool for the request based on the user information and the request characteristics information; and allocating a pool name and the storage tier in response to the request.

Aspects of the present disclosure can involve a system for storage allocation from a storage pool, the system involving, for receipt of a request for storage through an orchestrator communicatively coupled to a management system managing the storage pool, the request having user information and request characteristics information, the request characteristics information indicative of a use type for the request, means for determining a storage tier from the storage pool for the request based on the user information and the request characteristics information; and means for allocating a pool name and the storage tier in response to the request.

DETAILED DESCRIPTION

Figure 1:
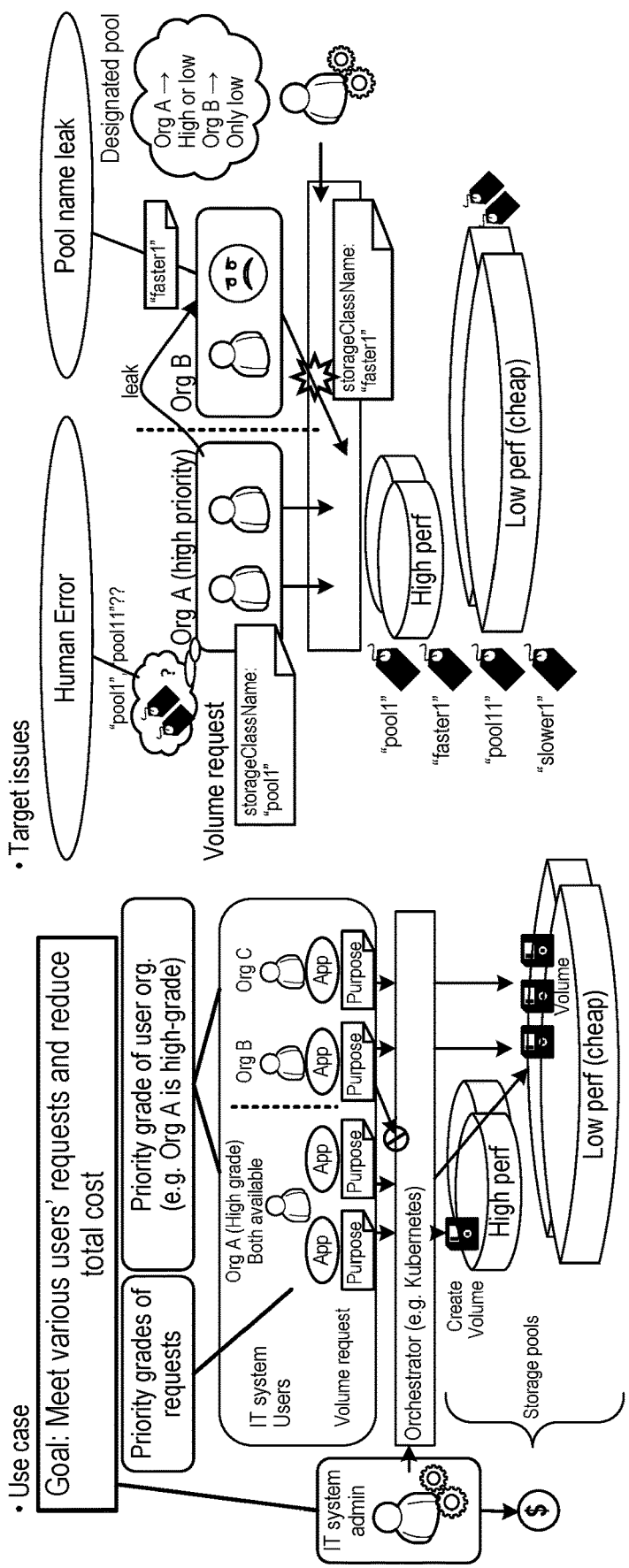
FIG. 1 illustrates an example use case and issues with the related art.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The example implementations described herein involve a storage pool determination system in order to address the issues in the related art. In an example implementation, the system includes a storage pool determination unit to prevent human error by automatic determination of the pool name. Further, the system includes a request hook unit to prevent ineligible usage by rejecting user volume requests including the pool name, and thereby prohibit inappropriate pool usage.

FIG. 1 illustrates an example use case and issues with the related art. In related art systems, IT system users deploy many applications, and each application can request volumes or disk space. Each application may also be directed to a different purpose (e.g., machine learning training, inference, etc.) Thus, users want to request different volume grades (e.g. low, high). Priority grades at the organization level can also vary (e.g. low, high).

IT system administrators utilize storage pools in pay-per-use manner to accommodate user volumes. To facilitate such functionality, the administrator utilizes an orchestrator to create and delete volumes according to the user requests in pools automatically.

Pools have variations: cheaper and lower-performance, and more expensive and higher performance.

Goal: IT system admin need to allocate these pools to users to meet users' requests and reduce total cost.

The related art allocation mechanisms in the related art has several issues with respect to storage pool selection. For example, the related art allocation mechanisms cannot prevent human error. The orchestrator requires users to specify the pool name in their volume request. In this scenario, the users may accidently choose the incorrect pool and incur high costs. Further, the related art allocation mechanisms cannot prohibit inappropriate usage. Once the pool name is leaked, the ineligible users in the organizations with a low priority grade can use the leaked pool name in their volume request, and the orchestrator cannot reject the request. Thus, unintended cost increases can occur.

Figure 2A:
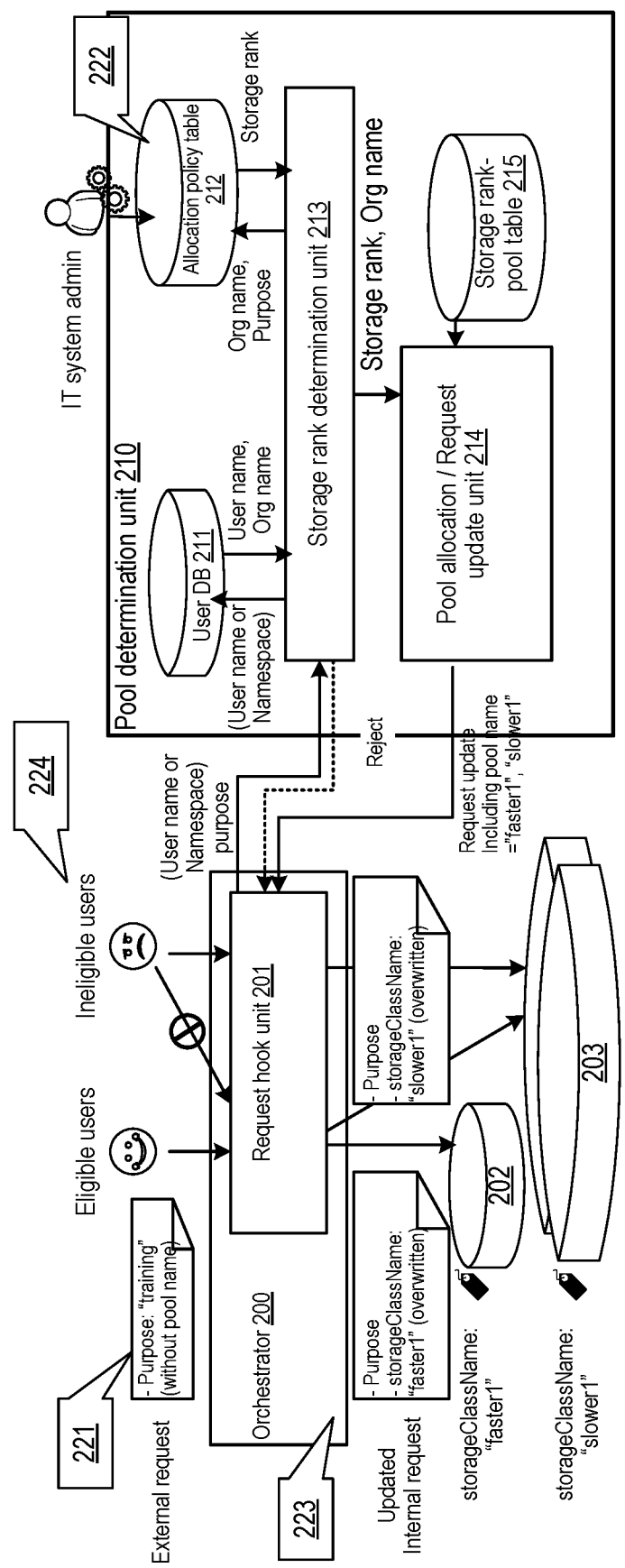
FIG. 2(A) illustrates an example storage pool determination system architecture and process flow, in accordance with an example implementation.

FIG. 2(A) illustrates an example storage pool determination system architecture and process flow, in accordance with an example implementation. In the example architecture, there is an orchestrator (e.g. Kubernetes) 200 that includes a function such as a request hook unit 201, for which all requests including the specific pool name will be rejected. Storage pools can include high performance (high pref) storage 202 (e.g., flash, solid state drive, etc.) and low performance (low pref) storage 203 which include cheaper storage such as hard disk drives.

Pool Determination Unit 210 can include a user database (DB) 211, an allocation policy table 212, and a storage rank determination unit 213 configured to reject requests in case no corresponding records can be found. Other elements can include a pool allocation/request update unit 214, which refers to storage rank-pool table 215 and is configured to find one available pool name that is ranked as specified storage rank (e.g., "gold"). If some pool name is already allocated to the organization name, then the unit will return the corresponding pool name.

The request hook unit 201 receives volume requests from users, which is referred to as the "External request" (221). This request includes only request type information and not a specific pool name. An example of the request type is purpose information (e.g. "training"). The request type information is different from the pool name. The pool name identifies only one storage pool, but the request type information indicates the preference and does not restrict the request to a specific pool. The request can include more request type information as needed (e.g. "training" and "big data"). Said request hook unit sends user identification information and request type information to a pool determination system as described herein.

The pool determination unit 210 retrieves the organization name from user database (DB) 211 and finds the storage rank from the allocation policy table 212 based on the organization name and the purpose information. Then, the pool determination unit 210 determines pool name based on storage rank and organization name using the storage rank—pool table, and generates the request update including the pool name (222).

The request hook unit 201 receives the request update from the pool determination unit 210. Then, the request hook unit 201 generates a "updated internal request" by updating external request contents so that includes the pool name. Further, the request hook unit 201 sends the updated internal request to the orchestrator main process to start the allocation mechanism according to the updated internal request. (223)

Further, the request hook unit 201 rejects an external request that includes a specific pool name. If this request goes into the orchestrator main process, an ineligible request would be allowed. Thus, the request hook unit detects such requests and rejects them (224)

In the architecture of FIG. 2(A), the request hook unit 201 is in the orchestrator 200 and snoops the external request coming from users to the orchestrator 200. When the orchestrator 200 receives a new request, said request hook unit 201 is kicked. The pool determination unit 210 is connected with the orchestrator 200 so that the orchestrator 200 and the pool determination unit 210 can send or receive messages. The number of orchestrators can be set in accordance with the desired implementation.

FIGS. 2(B) to 2(E) illustrates an example of solution variations for the storage pool determination system architecture, in accordance with an example implementation.

Figure 2B:
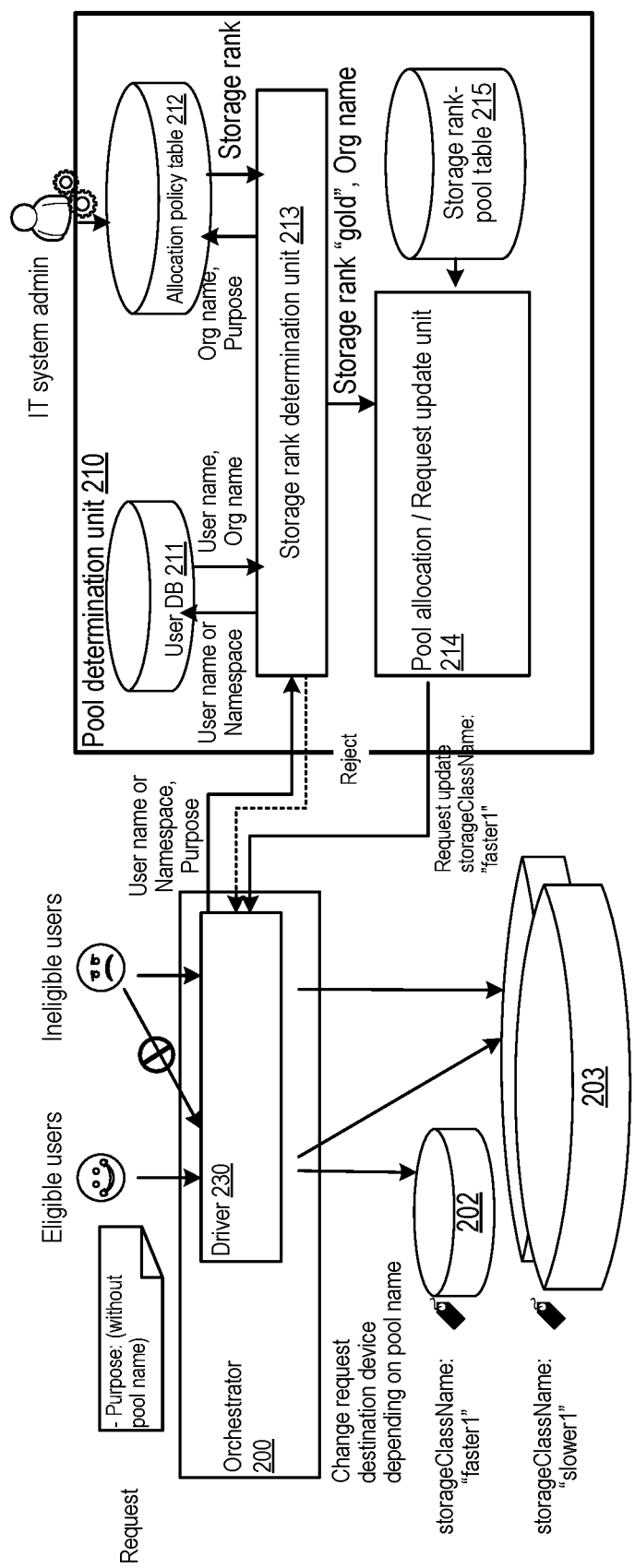
FIGS. 2(B) to 2(E) illustrates an example of solution variations for the storage pool determination system architecture, in accordance with an example implementation.

FIG. 2(B) illustrates a first variation in which the driver in orchestrator handles the request instead of the hook. In this example variation, the driver 230 is the unit that manages the actual allocation of the volumes. The driver 230 is configured to reject all requests that have a specific pool name and to generate and send updated internal requests to the specific device. Further, the driver 230 will change the request destination device depending on the pool name.

Figure 2C:
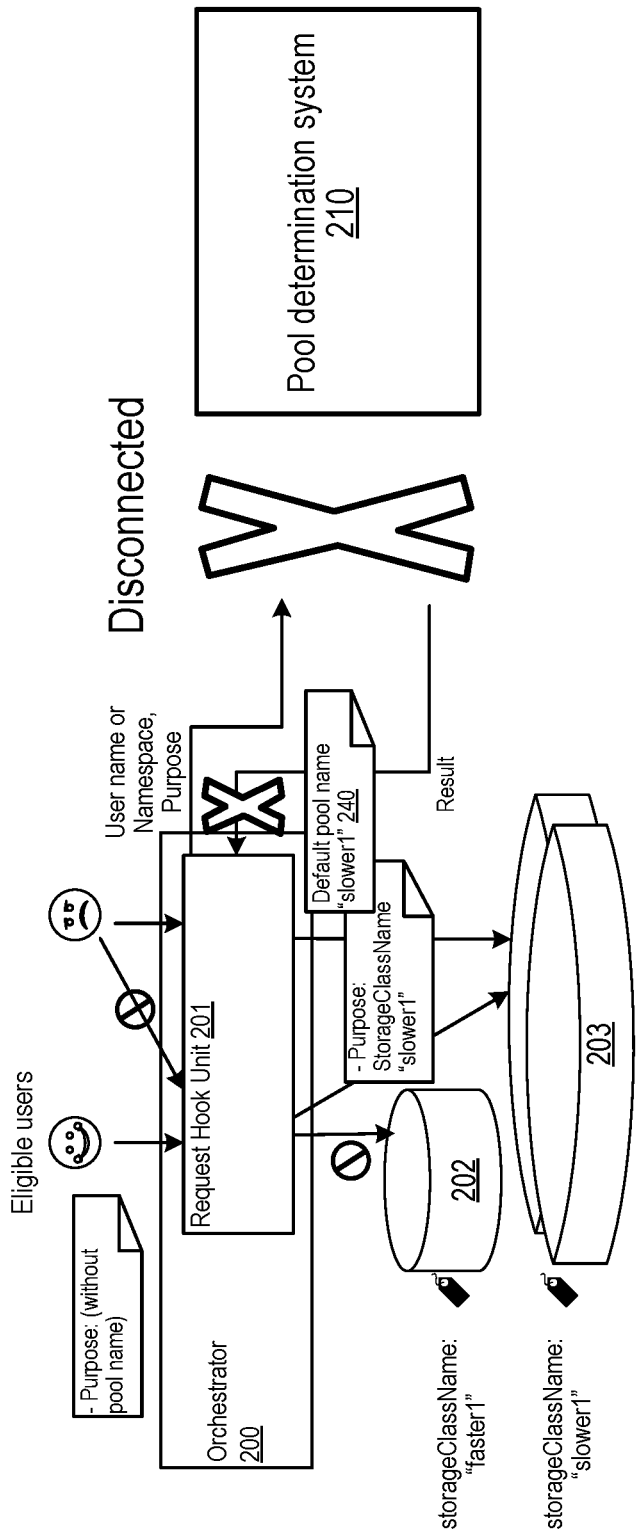

FIG. 2(C) illustrates another example variation in which a disconnection between the request hook 201 and the pool determination system 210 has occurred. If a disconnection has occurred (e.g., network failure, expiration of service contract), then the request hook 201 can utilize a default pool name parameter 240 without receiving a result from the pool determination system 210. In this example variation, the request hook 201 still rejects all ineligible requests. The IT system administrator can also set a default pool configuration (e.g., admin sets the cheaper pool name as default in order to prevent unintended cost increase)

Request hook 201 can determine by default pool name parameter without determination result from pool determination system. Even in this case, request hook rejects all ineligible requests the administrator sets the cheaper pool name as default in order to prevent unintended cost increase, in accordance with the desired implementation.) Further, all requests including specific pool name will be rejected, and the request hook only utilizes the default pool name.

Figure 2D:
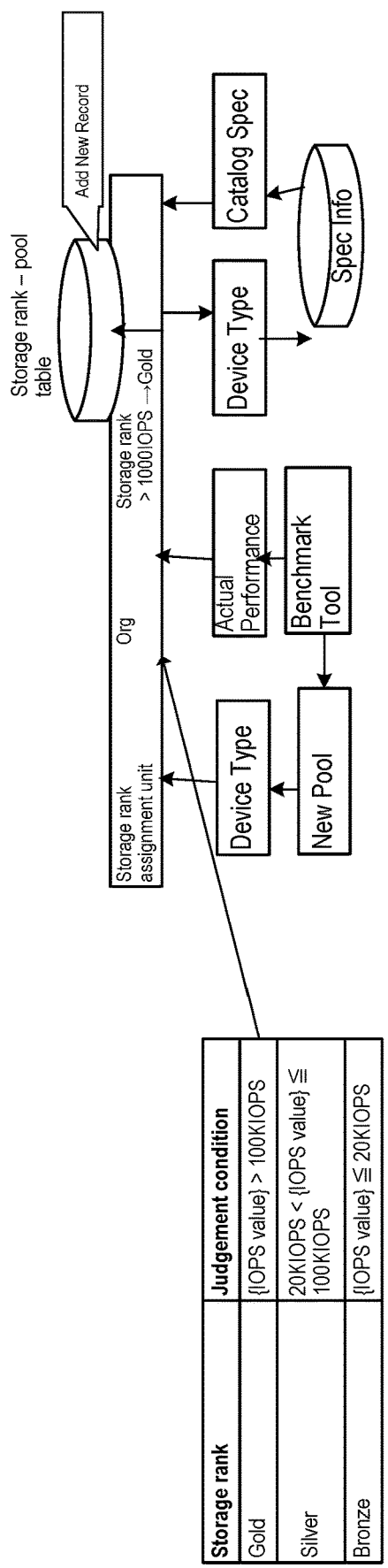

FIG. 2(D) illustrates an example of a new storage device addition, in accordance with an example implementation. Specifically, FIG. 2(D) illustrates an example of a storage rank assignment unit which handles a new storage device. When a storage pool addition event occurs, the unit detects the storage device performance specification, such as a catalog spec or actual performance monitoring data, and determines the corresponding rank for the device. The determination of the rank can be set in accordance with a judgment condition as illustrated in FIG. 2(D).

Figure 2E:
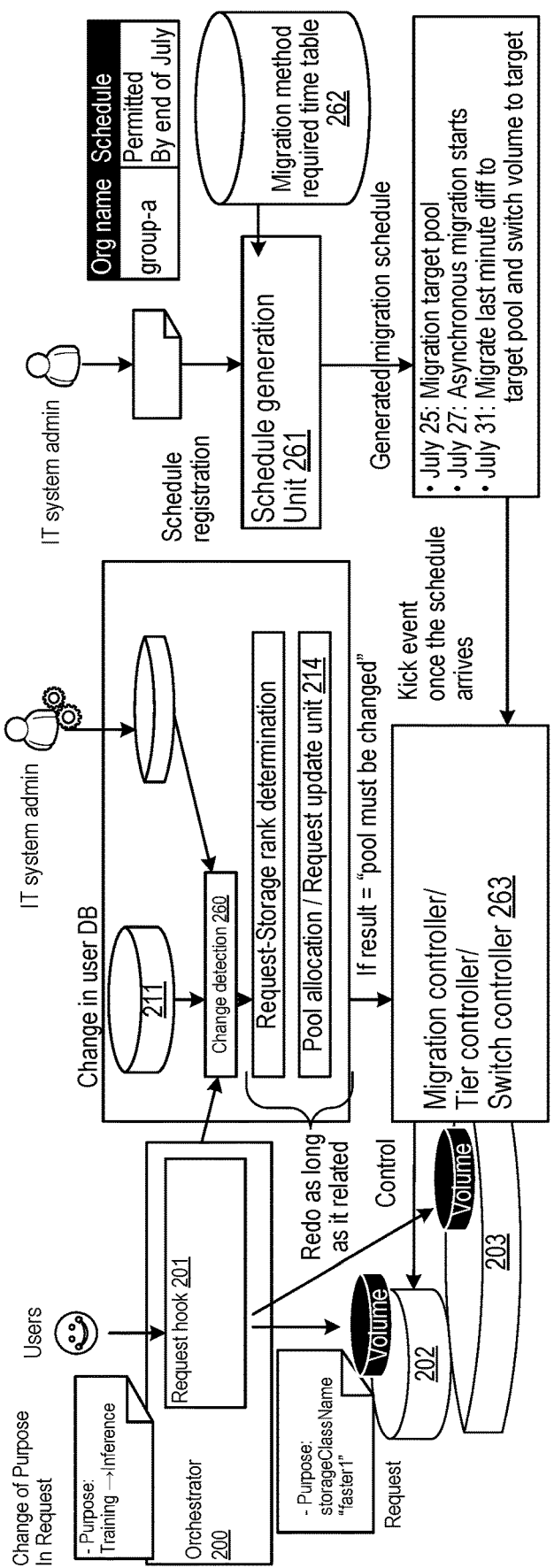

FIG. 2(E) illustrates an example remediation for a user/purpose change event in accordance with an example implementation. The change can involve a manual change or a scheduled change. Such a trigger can involve a detection of a change of purpose in requests (e.g. "training" to "inference"). Another change can involve a detection of a change 260 in the user DB 211 or purpose (e.g., transfer between organizations). Another change can involve a start and end of an organization schedule (e.g. limited time usage permission) through a schedule generation unit 261 according to a migration method time table 262. The storage pool determination system moves volumes from one pool to another after the end of the permitted time, and kicks the migration execution or the tier setting change via the controller 263. The request hook 201 detects change and recognize the volume reallocation.

Figure 3:
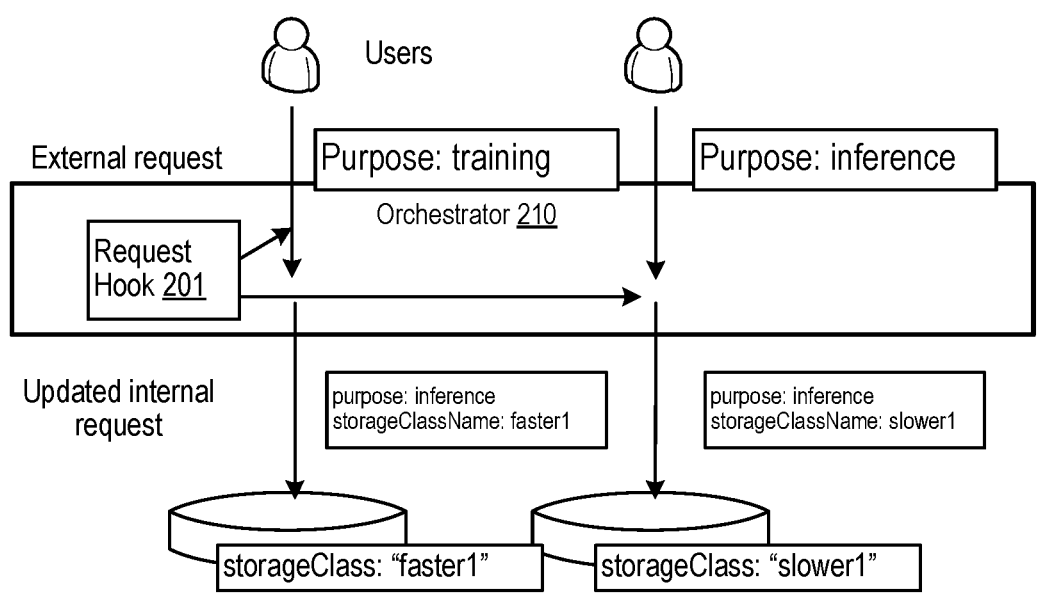
FIG. 3 illustrates an example of procedure of the request hook unit, in accordance with an example implementation.

FIG. 3 illustrates an example of procedure of the request hook unit, in accordance with an example implementation. When the request hook unit get an external request, it suspends the request, extracts user identification information and request type information from the external request. Then, the request hook unit sends the information to the pool determination system and waits for the result. Once the request hook unit obtains a result in a form of request update including the pool name, the request hook unit generates an updated internal request based on the external request and pool name. For example, the request hook unit copies the contents of the external request and updates a portion of the request so that it includes the pool name (e.g. "faster1"). For example, the request hook unit inserts field "storageClassName: faster1". Finally, the request hook sends the updated internal request to the main process of the orchestrator.

Figure 4:
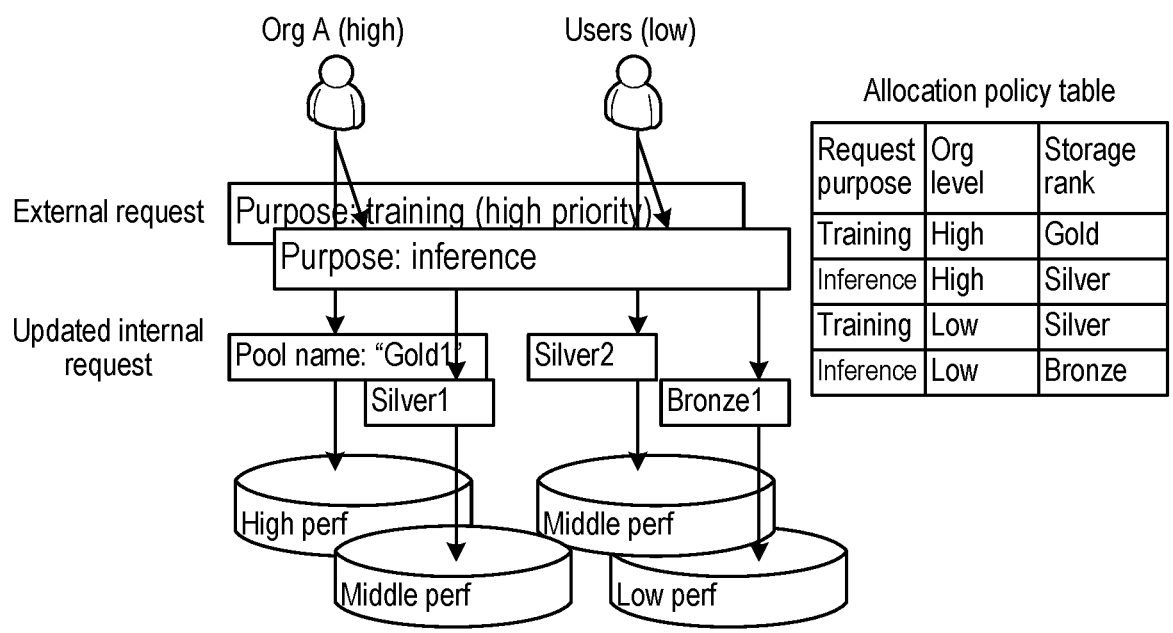
FIG. 4 illustrates an example of the allocation policy table and the result of determined pools, in accordance with an example implementation.

FIG. 4 illustrates an example of the allocation policy table and the result of determined pools, in accordance with an example implementation. The allocation policy table has columns including the "Request purpose" and the "Org level" to match the information of the external request. When a user in Org A sends a volume request indicating the purpose is "training" and "Org A" is categorized in Org level "high", the corresponding updated internal request will be "pool name=Gold1" because the first row of the allocation policy table indicates that the storage rank for the request is Gold. This result allows the user to use the storage pool with highest performance in this system because the request purpose and organization are both high priority. In the second case, when the same user in Org A sends another volume request saying the purpose is "inference", the corresponding updated internal request will be "Silver1". Accordingly, even the same user should use the lower-performance pool when the request purpose is not high priority. In the third case, another user in Org B sends the same request with the first case saying the request purpose is "training". However, the corresponding updated internal request will be "Silver2", which is the one with lower performance than the first case result "Gold1". This is because the third record of allocation policy table indicates that the low grade organization should use lower storage rank. The allocation policy table can be implemented as a program which can calculate the storage rank based on input of request purpose and organization level. And the allocation policy table can include other columns that can be used to characterize volume requests like requested data size and user location. As shown in FIG. 2(B), the IT system admin can change said allocation policy table via user interface or command line tools by inputting new records of Request Purpose, Org level and Storage rank.

Figure 5:
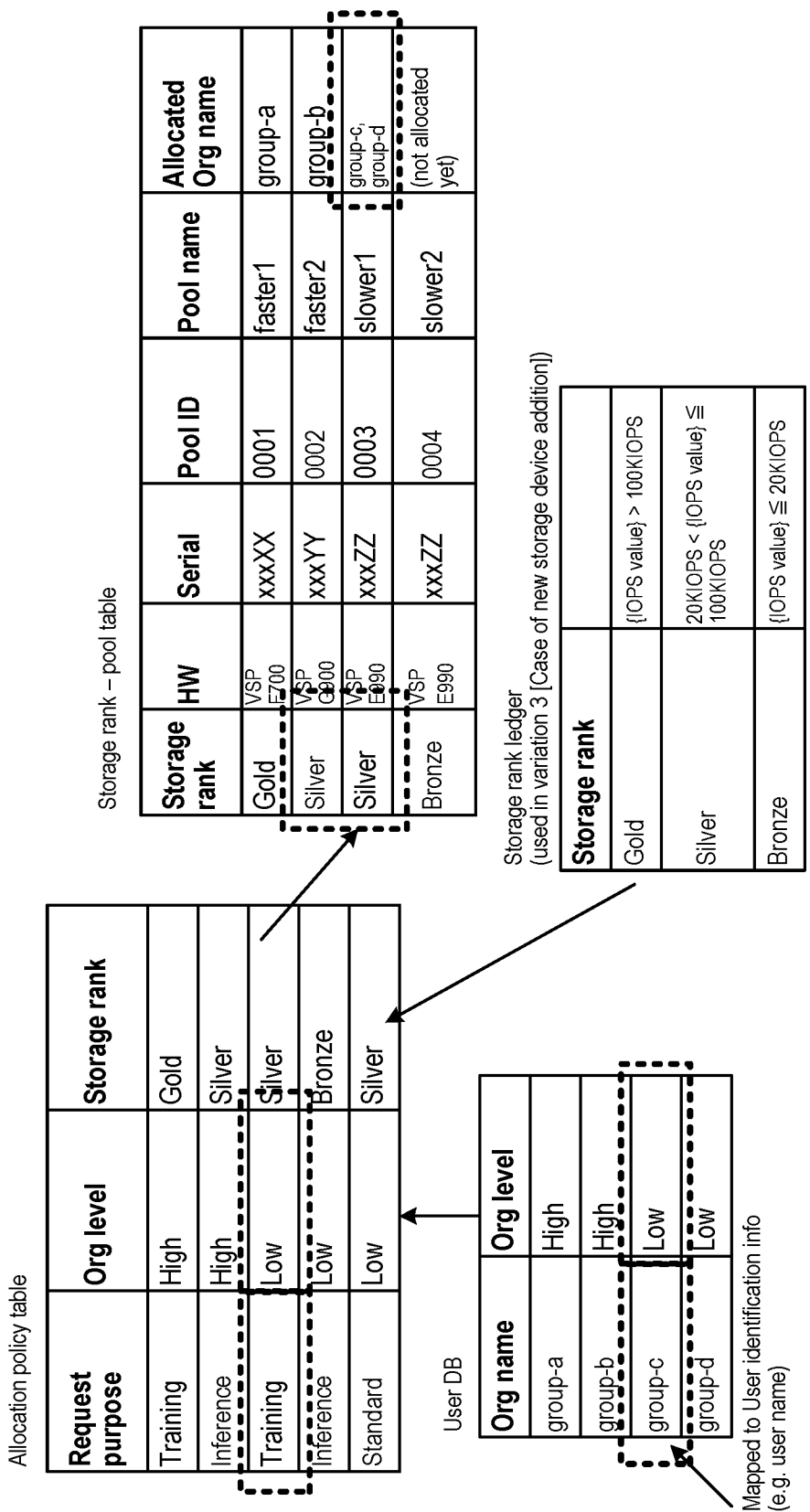
FIG. 5 illustrates an example of the allocation policy table and other tables, in accordance with an example implementation.

FIG. 5 illustrates an example of the allocation policy table and other tables, in accordance with an example implementation. First, the user DB has the Org name and Org level which is mapped with user identification information such as user name. The pool determination unit determines Org name or Org level from user name. Second, said allocation policy table has the columns of Org level, request purpose and storage rank. The pool determination unit determines the storage rank from combination of request purpose and Org level. For example, volume request specifies request purpose "Training" and the user belongs to group-c which is ranked in Org level "Low". When said allocation policy table includes a record which says "request purpose" is "Training", "Org level" is "Low" and "storage rank" is "Silver", then pool determination unit identifies that storage rank corresponding to the volume request is "Silver". Third, "storage rank—pool table" includes columns for storage rank and storage pool identification such as HW type, serial, pool ID. It also includes a column for "allocated org name" which shows which organization each storage pool is assigned. Lastly storage rank ledger has all candidates of storage rank and judgement condition which will be used when new storage device is added. (for example, it includes a record that "storage rank is "Silver" and that judgement condition is "20KIOPS<(IOPS value)<100KIOPS". This means a storage pool meets the judgement condition when the storage rank is labelled to the storage pool.).

Figure 6:
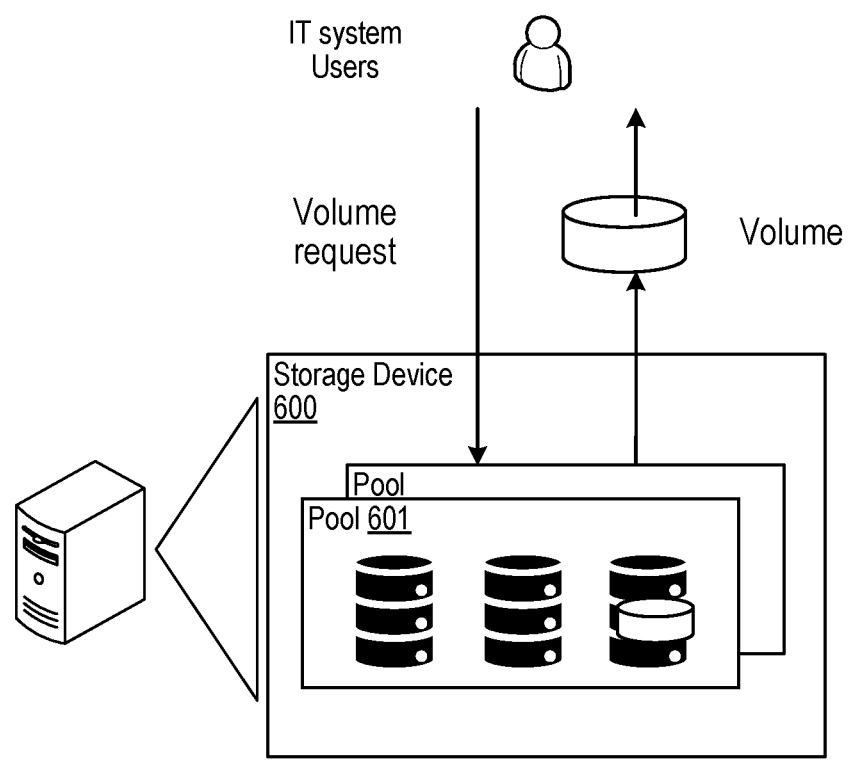
FIG. 6 illustrates an example storage system, in accordance with an example implementation.

FIG. 6 illustrates an example storage system, in accordance with an example implementation. A storage system can involve one or more storage devices 600 which can have its storage allocated to one or more storage pools 601. The storage pools 601 provide storage for storage volumes, and can be allocated in response to a volume requests by an IT user.

Figure 7A:
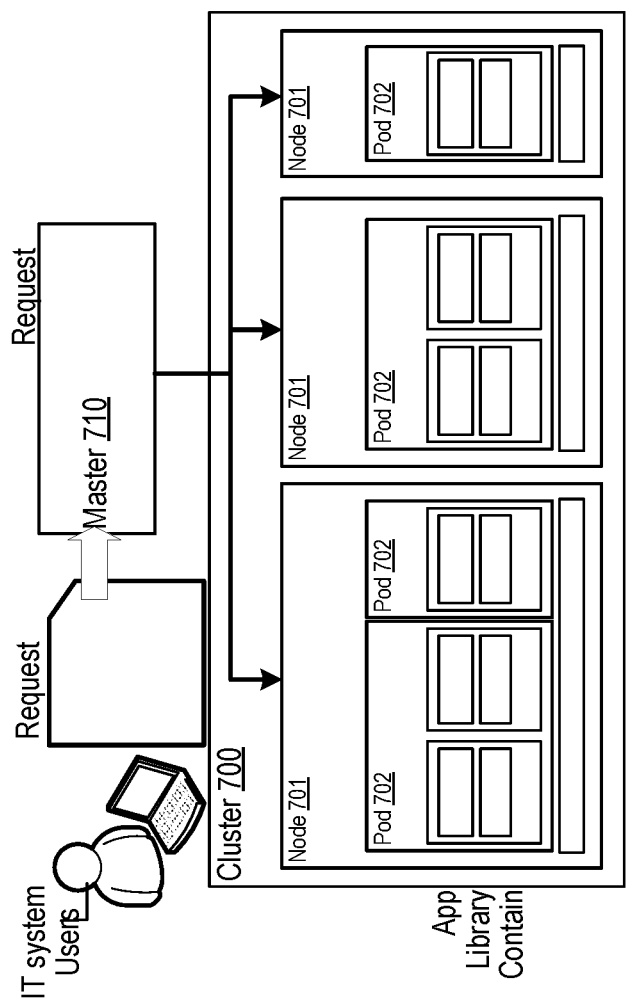
FIGS. 7(A) and 7(B) illustrate example orchestrators that can be utilized in accordance with an example implementation.
Figure 7B:
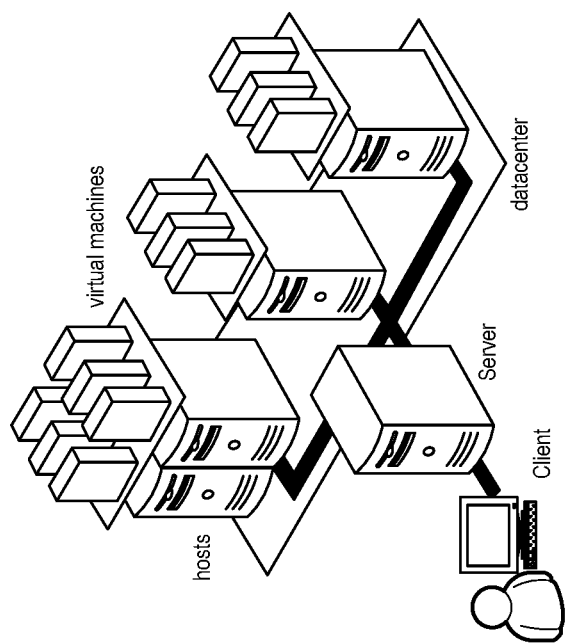

FIGS. 7(A) and 7(B) illustrate example orchestrators that can be utilized in accordance with an example implementation. The mechanism to prepare many storage devices and servers, and to allocate user resources (volume/CPU/memory) in the system. FIG. 7(A) illustrates an example of a Kubernetes orchestrator, where a master request 710 is distributed to nodes 701 within the cluster 700, with each node having corresponding pods 702. FIG. 7(B) illustrates an example of a VMSphere orchestrator, where the data center manages hosts and virtual machines as managed by the orchestrator server and controlled by the client.

Figure 8:
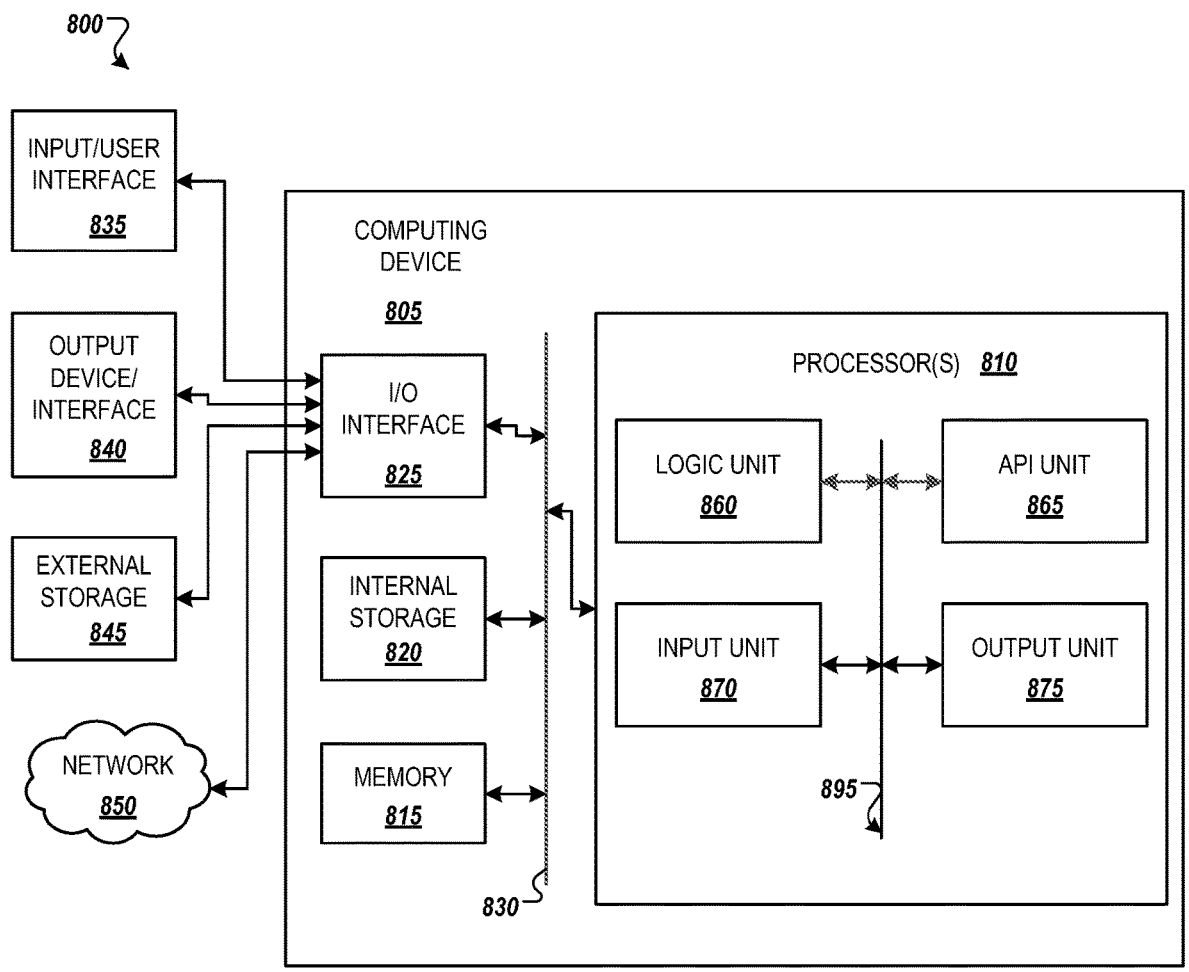
FIG. 8 illustrates an example computing environment with an example computer device suitable for use in some example implementations.

FIG. 8 illustrates an example computing environment with an example computer device suitable for use in some example implementations, such as a management system or server to facilitate the orchestrator 200 and pool determination unit 210. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

In example implementations, processor(s) 810 can facilitate storage allocation from a storage pool, which can involve for receipt of a request for storage through an orchestrator communicatively coupled to a management system managing the storage pool, the request comprising user information and request characteristics information, the request characteristics information indicative of a use type for the request, determining a storage tier from the storage pool for the request based on the user information and the request characteristics information; and allocating a pool name and the storage tier in response to the request. The use type can indicate the purpose of the allocation as described with respect to FIG. 2(A), or can be directed otherwise in accordance with the desired implementation.

Processor(s) 810 can be configured to determine the storage tier from the storage pool for the request by determining an organization level for the request from the user information and a purpose of the request from the request characteristics information; and referencing allocation policy information to determine the storage tier corresponding to the purpose and the organization level, the allocation policy information indicative of a mapping between the storage tier, the purpose, and the organization level as illustrated in FIGS. 2(A)-5.

As illustrated in FIGS. 2(A)-5, processor(s) 810 can be configured to allocate the pool name in response to the request by determining an organization name for the request from the user information; and referencing pool table information to determine the pool name corresponding to the determined storage tier and the organization name, the pool table information indicative of a mapping between the pool name, the storage tier and the organization name.

As illustrated in FIG. 2(A)-5, processor(s) 810 can be configured to, for a determination that no storage tier corresponds to the user information and the request characteristics information, reject the request as ineligible through the request hook unit 201 and storage rank determination unit 213.

For an addition of new storage to the storage pool, processor(s) 810 can be configured to allocate the new storage pool to a corresponding storage tier based on a comparison of a performance specification of the new storage to a storage ledger of the management system as illustrated in FIGS. 2(A)-5.

Processor(s) 810 can be configured to allocate the pool name by for the orchestrator being disconnected from the management system, allocating a default pool name based on the request characteristics information as illustrated in FIG. 2(C).

Depending on the desired implementation, the request can involve a schedule associated with the request characteristics information as illustrated in FIG. 2(E) wherein the allocation of the pool name and the storage tier is changed according to the request characteristics information and the schedule as illustrated in FIG. 2(E).

Processor(s) 810 can be configured to, for receipt of a change in the management system to one or more of an allocation policy information indicative of a mapping between the storage tier, the purpose, and the organization level, pool table information indicative of a mapping between the pool name, the storage tier and the organization name, or user database information mapping the user information to organization level, change one or more of the storage tier and the pool name for the request in response to the change in the management system as illustrated in FIGS. 2(D) and 2(E).

The example implementations facilitate the determination of storage pool based on user identification information and request type information such as the purpose in the external request. After the IT system admin configures the allocation policy table properly, the user volume requests will be allocated to appropriate storage pools automatically. The example implementations thereby prevent erratic usage of costly storage pools due to user error. Further, the example implementations prevent inappropriate usage of storage pool by rejecting the ineligible request. Hence, the example implementations reduce total cost of storage pools.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for storage allocation from a storage pool, the method comprising:
   for receipt of a first request for storage through an orchestrator communicatively coupled to a management system managing the storage pool, the first request comprising user information and request characteristics information, the request characteristics information indicative of a use type for the first request:
      determining a storage tier from the storage pool for the first request based on the user information and the request characteristics information; and
      identifying a pool name and allocating the storage tier in response to the first request;
   for receipt of a second request for storage through the orchestrator, the second request comprising user information, request characteristics information, and a specified pool name:
      rejecting the second request as ineligible to prevent incorrect storage resource allocation; and
   for change in the management system to pool table information indicative of a mapping between the pool name, the storage tier, and an organization name, changing the storage tier and the pool name for the first request in response to the change in the management system.

2. The method of claim 1, wherein the determining the storage tier from the storage pool for the first request comprises:
- determining an organization level for the first request from the user information and a purpose of the first request from the request characteristics information; and
- referencing allocation policy information to determine the storage tier corresponding to the purpose and the organization level, the allocation policy information indicative of a mapping between the storage tier, the purpose, and the organization level.

3. The method of claim 1, wherein the identifying the pool name in response to the first request comprises:
- determining an organization name for the first request from the user information; and
- referencing pool table information to determine the pool name corresponding to the determined storage tier and the organization name, the pool table information indicative of a mapping between the pool name, the storage tier and the organization name.

4. The method of claim 1, further comprising, for a determination that no storage tier corresponds to the user information and the request characteristics information, rejecting the first request as ineligible.

5. The method of claim 1, further comprising, for an addition of new storage to the storage pool, allocating the new storage pool to a corresponding storage tier based on a comparison of a performance specification of the new storage to a storage ledger of the management system.

6. The method of claim 1, wherein the identifying the pool name comprises:
- for the orchestrator being disconnected from the management system, identifying a default pool name based on the request characteristics information.

7. The method of claim 1, wherein the first request further comprises a schedule associated with the request characteristics information, and
- wherein the identification of the pool name and the allocation of the storage tier is changed according to the request characteristics information and the schedule.

8. The method of claim 1, further comprising:
- for change in the management system to one or more of an allocation policy information indicative of a mapping between the storage tier, a purpose, and an organization level, or user database information mapping the user information to the organization level, changing one or more of the storage tier and the pool name for the first request in response to the change in the management system.

9. A non-transitory computer readable medium, storing instructions for storage allocation from a storage pool, the instructions comprising:
- for receipt of a first request for storage through an orchestrator communicatively coupled to a management system managing the storage pool, the first request comprising user information and request characteristics information, the request characteristics information indicative of a use type for the first request:
  - determining a storage tier from the storage pool for the first request based on the user information and the request characteristics information; and
  - identifying a pool name and allocating the storage tier in response to the first request;
- for receipt of a second request for storage through the orchestrator, the second request comprising user information, request characteristics information, and a specified pool name:
  - rejecting the second request as ineligible to prevent incorrect storage resource allocation; and
- for change in the management system to pool table information indicative of a mapping between the pool name, the storage tier and an organization name, changing one or more of the storage tier and the pool name for the first request in response to the change in the management system.

10. The non-transitory computer readable medium of claim 9, wherein the determining the storage tier from the storage pool for the first request comprises:
- determining an organization level for the first request from the user information and a purpose of the first request from the request characteristics information; and
- referencing allocation policy information to determine the storage tier corresponding to the purpose and the organization level, the allocation policy information indicative of a mapping between the storage tier, the purpose, and the organization level.

11. The non-transitory computer readable medium of claim 9, wherein the identifying the pool name in response to the first request comprises:
- determining an organization name for the first request from the user information; and
- referencing pool table information to determine the pool name corresponding to the determined storage tier and the organization name, the pool table information indicative of a mapping between the pool name, the storage tier and the organization name.

12. The non-transitory computer readable medium of claim 9, the instructions further comprising, for a determination that no storage tier corresponds to the user information and the request characteristics information, rejecting the first request as ineligible.

13. The non-transitory computer readable medium of claim 9, further comprising, for an addition of new storage to the storage pool, allocating the new storage pool to a corresponding storage tier based on a comparison of a performance specification of the new storage to a storage ledger of the management system.

14. The non-transitory computer readable medium of claim 9, wherein the identifying the pool name comprises:
- for the orchestrator being disconnected from the management system, identifying a default pool name based on the request characteristics information.

15. The non-transitory computer readable medium of claim 9, wherein the first request further comprises a schedule associated with the request characteristics information, and
- wherein the identification of the pool name and the allocation of the storage tier is changed according to the request characteristics information and the schedule.

16. The non-transitory computer readable medium of claim 9, wherein for change in the management system to one or more of an allocation policy information indicative of a mapping between the storage tier, a purpose, and an organization level, or user database information mapping the user information to the organization level, changing one or more of the storage tier and the pool name for the first request in response to the change in the management system.

17. The method of claim 1, further comprising:
for change in the management system to user database information mapping the user information to an organization level, changing the storage tier and the pool name for the first request in response to the change in the management system.

18. The method of claim 8, wherein the purpose includes one of machine learning training and inference.

19. The method of claim 8, wherein the purpose includes switching from training to inference.

* * * * *